May 12, 1964
E. P. HALLIGAN
3,132,359
MOUNTING MEANS FOR SUPPORTING A DIE STOCK
ON A POWER DRIVE UNIT
Filed Dec. 29, 1960
2 Sheets-Sheet 1
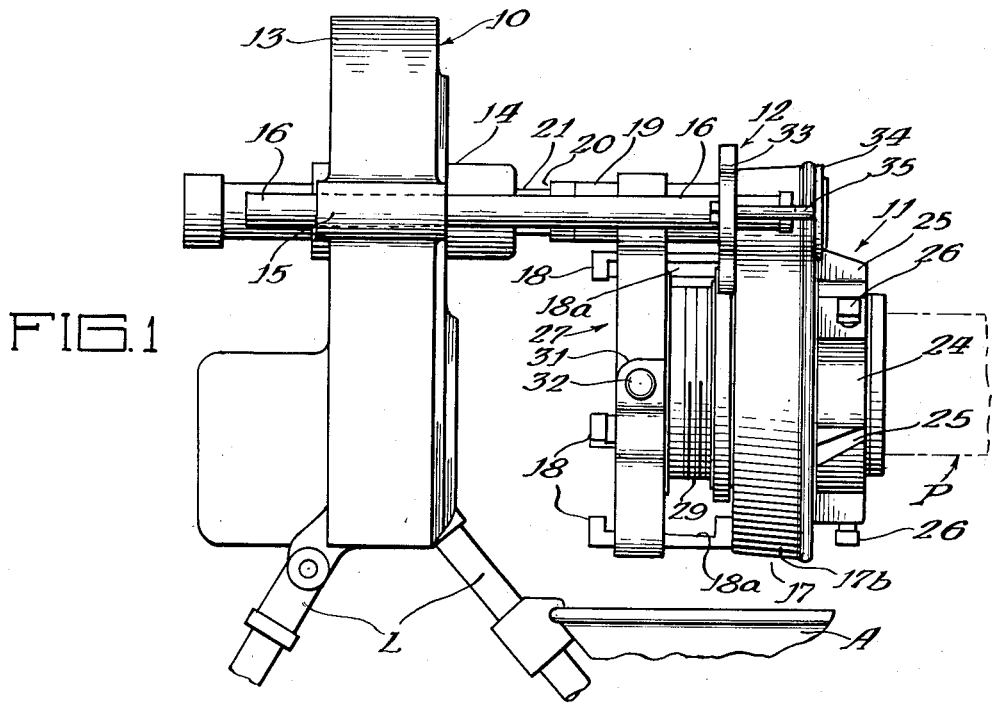
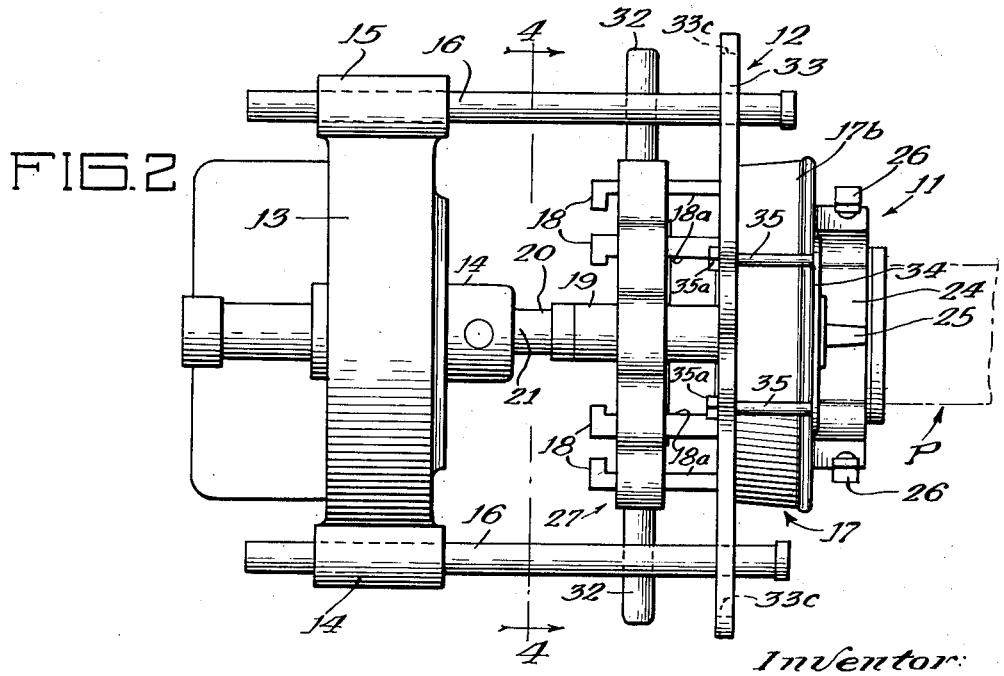
Inventor:
Eugene P. Halligan May 12, 1964 E. P. HALLIGAN 3,132,359
MOUNTING MEANS FOR SUPPORTING A DIE STOCK
ON A POWER DRIVE UNIT
Filed Dec. 29, 1960 2 Sheets-Sheet 2
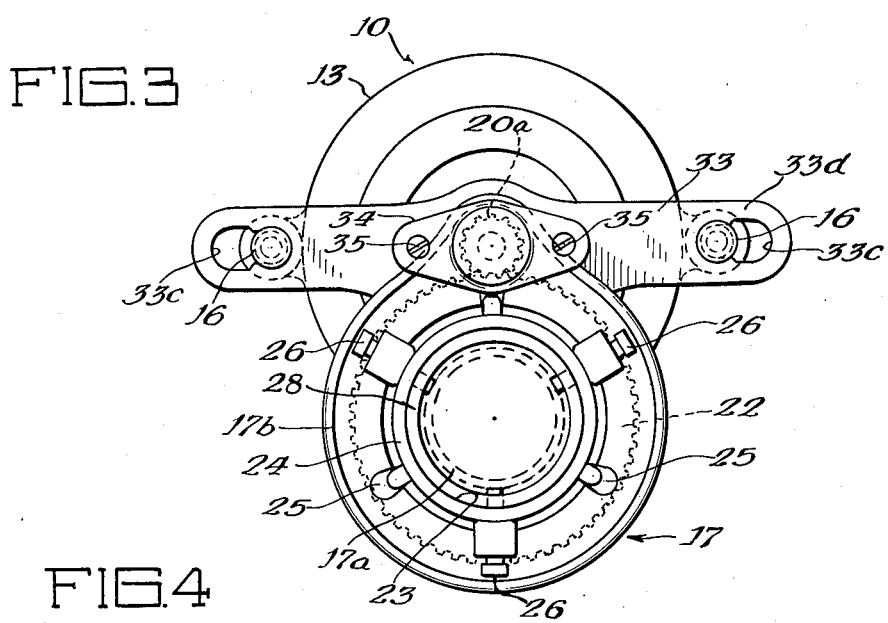
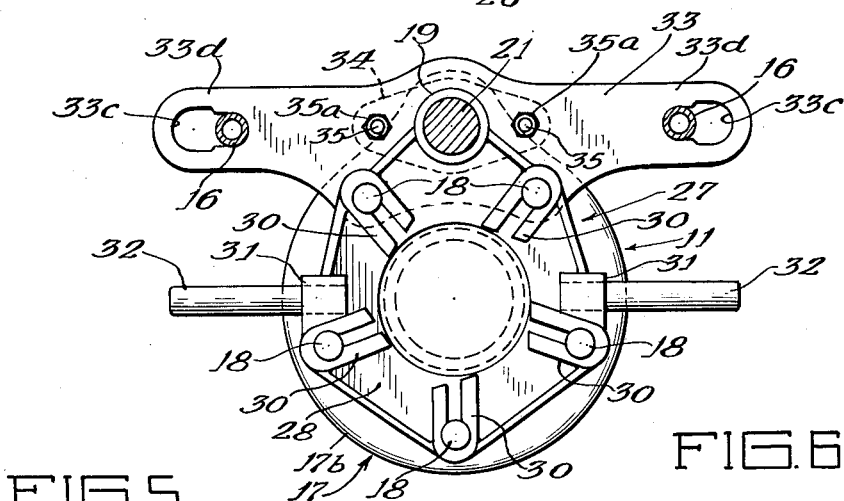
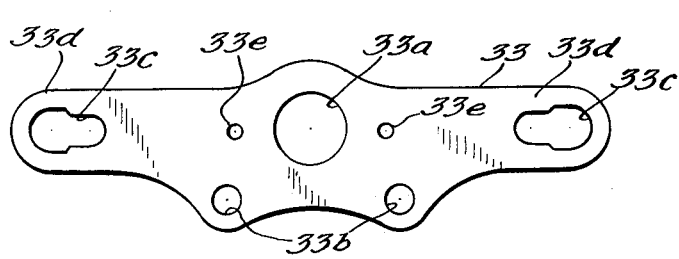
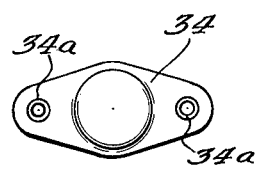

United States Patent Office 3,132,359
Patented May 12, 1964

3,132,359
MOUNTING MEANS FOR SUPPORTING A DIE STOCK ON A POWER DRIVE UNIT
Eugene P. Halligan, Glen Ellyn, Ill., assignor, by mesne assignments, to Lectrolite Corporation, Defiance, Ohio, a corporation of Maryland
Filed Dec. 29, 1960, Ser. No. 79,400
5 Claims. (Cl. 10—89)

This invention relates to geared receding threading devices and in particular to a new and improved mounting means for use with such threading devices.

To insure tight joints between pipes and their connecting members the threads cut into pipes are usually of the tapered variety. These pipe threads have been standardized, are referred to as the American National Standard and have a taper of one in sixteen, or ¾ inch per foot, measured along the pipe axis.

The usual method of cutting these threads is with suitable dies. This may be accomplished manually but to increase efficiency, portable power units are frequently employed. In the past the use of portable power drives to operate receding threading devices has required the use of special drive shafts, vises to hold the pipe, chuck adapters for the power unit and other tools of a specialized and expensive nature.

Therefore, an object of the invention is to provide a new and improved mounting means to be used in conjunction with receding threading devices and power drives.

Another object of the invention is to provide a new and improved means for operatively suspending a receding threading device from a portable power drive.

Still another object of the invention is to provide a new and improved mounting means which transfers the overhung weight of the receding threading device from the power drive chuck to the power drive housing, thereby removing strain from the chuck.

Yet another object of the invention is to provide an improved mounting means which is readily attachable to receding threading devices presently in use.

A further object of the invention is to provide a connecting means for increasing the stability of a portable power drive and receding threading device by transmitting the torque generated by the portable power drive back to its own housing.

The invention is illustrated in a preferred embodiment of the accompanying drawings in which:

FIG. 1 is a side elevational view showing the receding threading device mounted on a portable power drive by the mounting means of the invention;

FIG. 2 is a top plan view of the device;

FIG. 3 is a front elevational view of the threading device of FIG. 1;

FIG. 4 is a vertical section taken substantially as indicated along line 4—4 in FIG. 2;

FIG. 5 is a front elevational view of the connecting yoke removed from the receding threading device; and FIG. 6 is a front elevational view of the pinion cover plate removed from the receding threading device.

Referring to the drawings, the device of the present invention includes, generally, a portable power drive unit 10 on which a receding threading device or die stoock 11 is mounted by mounting means 12.

Referring more specifically to FIGS. 1 and 2, the portable power unit 10 is supported on a plurality of legs L which carry a pan A for catching lubricating oil and metal chips. The power unit has a suitably shaped housing 13 the lower portion of which contains an electric motor and the upper part of which houses power output means driven by the motor and including an adjustable chuck 14 which rotates about a horizontal axis.

Housing 13 has laterally extending bosses 15 which are axially bored to slidably receive parallel support arms 16.

Die stock 11 is seen to comprise a tapered pin plate 17 affording a frame having a generally annular form defining an opening 17a and a peripheral skirt 17b adapted to rigidly receive a plurality of circumferentially aligned taper pins 18. A pinion journal 19 rigidly threadedly secured to pin plate 17 rotatably supports a pinion shaft 20 which has one end 21 suitable for engagement with chuck 14, and has a pinion 20a within the area bounded by skirt 17b. As seen in FIG. 3, a ring gear 22 has a threaded central axial aperture 23 and is rotatably mounted in pin plate 17 with the aperture 23 axially aligned with the pin plate opening 17a and the gear teeth in meshing relation with pinion 20a. A ferrule 24 is integrally secured to gear 22 by a plurality of spaced ribs 25 and is provided with a plurality of circumferentially spaced, radially extending, fastening means 26, such as pipe screws, for fixedly securing to the ferrule 24 a pipe P (shown by dotted lines) which is to be threaded.

A die head designated generally at 27 is adapted to be slidably movable on taper pins 18 and pinion shaft 20 and embodies a generally annular member 28 having a sleeve 29 screwed into the central aperture 23 of gear 22. Member 28 has a series of circumferentially spaced radially slotted holder 30 adapted to receive suitable die chasers (not shown) of a conventional nature. When in position, the die chasers are yieldingly urged by conventional spring means (not shown) to abut on the tapered faces 18a, respectively, of taper pins 18. Annular member 28 is also provided with a pair of horizontally opposed hubs 31, adapted for the removable reception of lifting handles 32.

As best seen in FIG. 5, the mounting means 12 for suspending die stock 11 in operative position on power drive unit 10, comprises a metal yoke plate 33 having an opening 33a centered on its vertical median line for the reception of pinion journal 19. A pair of bores 33b in yoke 33 are impaled by the taper pins 18. Lateral lobes 33d at the sides of the yoke have keyhole slots 33c, each adapted to receive an arm 16 of power drive 10. When assembled, yoke 33 is flush against the adjacent face of pin plate 17 with bore 33a receiving pinion journal 19 and bores 33b receiving taper pins 18, respectively.

Abutting pin plate 17 and overlying pinion 20a is a clamp plate in the form of a pinion provided with a pair of holes adjacent each end that are aligned with a pair of holes 33e in yoke 33; and bolts 35 pass through the aligned holes and are secured with nuts 35a to fixedly fasten clamp plate 34, pin plate 17 and yoke 33 together.

Die stock 11 may be mounted on power drive unit 10 by manually positioning the entire assembly so that keyhole slots 33c are aligned with and received by arms 16. The end 21 of driving pinion 20 is now in alignment with and may be connected to adjustable chuck 14.

The section of pipe P to be threaded is secured to ferrule 24 by fastening means 26 as previously described. The end of the pipe just touches the die chasers (not shown). Power drive 10 is then actuated and the rotating chuck 14 transmits rotative force to gear 22 through driving pinion 20a. Gear 22 causes ferrule 24, and therefore, the pipe secured thereto to rotate. Gear 22, it should be repeated, is rotatively mounted in pin plate 17 but is fixed against axial movement. Through the threaded association of sleeve 29 to central aperature 23 of gear 22, the latter's rotation imparts axial, rectilinear movement to die head 27 causing the die chasers to travel over the pipe and cut a thread therein. As this movement occurs, the die chasers, by virtue of being resiliently urged against the faces 18a of taper pins 18, gradually radially withdraw from pipe P, thereby forming a proper receding thread.

Should the threading operation encounter difficulty due to unexpectedly high friction between the die chasers and pipe P, the power drive will not tip over, as has often been the case, nor will it require additional securing means. The mounting means of the invention serves to transmit any excessive torque generated by the power drive back to the drive housing, effectively canceling the tipping moment and thereby materially increasing the stability of the entire assembly.

A further advantage of the present invention is apparent when it is observed that a pipe thread may be cut without the need for additional cumbersome tools. Since yoke 33 is fixed against movement when mounted on arms 16, a slidable mounting used in conjunction with a universal drive shaft and vise are rendered unnecessary. The advantage of simplicity is apparent. Further, in the past, it has been necessary to mount die stock 11 on power drive 10 whereby the entire overhung weight of die stock 11 was borne by chuck 14. This undesirable condition is also avoided through the use of the present invention.

The foregoing detailed description is given for clearness of understanding only and no unnecessary limitations are to be understood therefrom, as modifications will be obvious to those skilled in the art.

I claim:

1. In a portable threading device, in combination: an independent portable power drive unit having an external housing, output means for delivering rotational movement, and a pair of parallel support arms on opposite sides of the housing flanking the output means;

a separate portable die stock having a frame, relatively rotatable pipe gripping means and die head means carried in the frame, interengaging feed screw means on said relatively rotatable means so that rotation of one of said relatively rotatable means produces rectilinear movement of the other of said means, and drive means drivingly connected to said output means for rotating said one of said relatively rotatable means;

and mounting means including a yoke supporting the die stock on said parallel support arms, said yoke having apertures impaled by said support arms and an opening on the median line between said apertures, said medial opening having the die stock drive means extending therethrough, and means detachably securing the die stock frame fixedly to the yoke to support the weight of the die stock on said arms and lock the die stock against rotation about the power drive unit, said output means of the power unit and said drive means on the die stock being substantially axially aligned when said yoke is mounted on said arms.

2. The combination of claim 1 in which the die stock is of the receding type and has chaser guide pins extending from the frame parallel to the support arms, and in which the yoke has openings to receive said guide pins.

3. The combination of claim 1 in which a clamp plate is on the opposite side of the die stock frame from the yoke, and the securing means clamps the frame between the yoke and the plate.

4. The combination of claim 3 in which the die stock drive means includes an input shaft with a pinion thereon, and the clamp plate affords a cover for said pinion.

5. The combination of claim 4 in which the medial opening is a hole in the yoke through which the input shaft extends, the yoke has a pair of bolt holes flanking said medial opening, the clamp plate has bolt holes aligned with those in the yoke, and the securing means comprises bolts extending through the aligned bolt holes and nuts on said bolts.

References Cited in the file of this patent

UNITED STATES PATENTS

| 1,471,872 | Vosper | Oct. 23, 1923 |
| 1,943,643 | Vosper | Jan. 16, 1934 |
| 2,887,886 | Chaser et al. | May 26, 1959 |
| 3,002,205 | Buyer | Oct. 3, 1961 |
| 3,009,178 | Buyer | Nov. 21, 1961 |